United States Patent [19]
Nichols

[11] 3,771,317
[45] Nov. 13, 1973

[54] VAPOR RECOVERY

[75] Inventor: Richard A. Nichols, Santa Ana, Calif.

[73] Assignee: Parker-Hannifin Corporation, Cleveland, Ohio

[22] Filed: Dec. 7, 1970

[21] Appl. No.: 95,640

[52] U.S. Cl.................. 62/54, 55/88, 220/85 VR
[51] Int. Cl. ........................................... F17c 13/00
[58] Field of Search .................. 220/85 VS, 85 VR; 62/52, 54, 55; 55/88, 89, 93

[56] References Cited
UNITED STATES PATENTS

| | | | |
|---|---|---|---|
| 2,059,942 | 11/1936 | Gibson | 220/85 VR |
| 2,849,150 | 8/1958 | Thompkins Jr. | 220/85 VR |
| 2,074,644 | 3/1937 | Drennan | 55/88 |
| 3,449,922 | 6/1969 | Ruff et al. | 62/228 |
| 1,463,782 | 8/1923 | Armstrong | 55/88 |
| 2,379,215 | 6/1945 | Brinkmann | 220/85 VR |
| 2,765,872 | 10/1956 | Hartman et al. | 55/88 |
| 2,947,379 | 8/1960 | Aubrey | 220/85 VR |
| 3,266,262 | 8/1966 | Moragne | 62/54 |

*Primary Examiner*—Meyer Perlin
*Assistant Examiner*—Ronald C. Capossela
*Attorney*—Diller, Brown, Ramik & Holt

[57] ABSTRACT

This disclosure relates to a vapor recovery system particularly adapted to recover volatile liquid vapors from a tank during the filling of a tank with the volatile liquid. The disclosure particularly relates to the operation of the vapor recovery system, particularly the absorber system thereof, at a low temperature whereby maximum efficiency can be obtained with low pressures. The absorber system is also improved by recirculating the absorbing liquid to minimize air absorption in the liquid stream. The collective liquid returning to the liquid reservoir is utilized as a heat exchange medium to improve the efficiency of other portions of the recovery system.

28 Claims, 3 Drawing Figures

INVENTOR
RICHARD A. NICHOLS
By Dillon, Brown, Kamite Holt

ATTORNEYS

VAPOR RECOVERY

This invention relates in general to a vapor recovery system, and more particularly to a system for recovering volatile liquid vapors which result during the filling of a tank. The recovery system is particularly adaptable to the recovery of vapors which occur during the filling of fuel tanks.

BACKGROUND OF THE INVENTION

When filling a tank with a highly volatile liquid, such as a hydrocarbon fuel, large quantities of vapor occur. For many years, these vapors have been lost to the atmosphere with the resultant loss of the value of the vapors. In addition, the atmosphere has been polluted by such escaping vapors.

In the past, systems have been developed by others. A typical system is that found in the patent to Albert H. Tompkins, Jr. entitled Vapor Recovery System, U.S. Pat. No. 2,849,150, granted Aug. 26, 1958. These prior systems include, among other apparatus, an absorber wherein the recovered vapor is absorbed into the recovery liquid and is returned to the liquid storage reservoir and sizeable quantities of absorbed air are also released at the reservoir.

PURPOSE OF THIS INVENTION

In accordance with this invention, it is proposed to provide a relatively simple vapor recovery system which is of sufficient efficiency so as to be economically feasible. In the first place, the absorbing liquid is recirculated through the absorber to minimize air absorption. This provides for a maximum over-all low temperature absorber efficiency.

It is also proposed to refrigerate the liquid within the absorber tank so that the absorber operates at a low temperature which allows the operation of the absorber at lower pressures with the same or better efficiency than before.

The vapor recovery system also utilizes the low temperature liquid stream returning to the liquid storage reservoir as a heat exchange medium to lower the temperature of all liquid being separately supplied to the absorber system whereby the efficiency of the low temperature operation of the absorber system is enhanced.

The liquid being returned to the liquid supply reservoir is passed into a flash separator wherein air entrapped within the returning liquid by absorption may be removed thereby further increasing the efficiency of the recovery system.

A further feature of the vapor recovery system is the passage of compressed incoming vapors first through a finned tube aftercooler and then to a liquid aftercooler with the finned tube aftercooler initially reducing the temperature of the hot compressed vapors sufficiently to prevent vaporization of the liquid coolant within the liquid aftercooler. The use of the finned tube aftercooler also increases the liquid aftercooler efficiency allowing the same to be used at lower than normal pressures. The use of the finned tube aftercooler further permits an optimum use of temperature gradients in the two aftercoolers, thereby giving greater over-all efficiency.

With the above and other objects in view that will hereinafter appear, the nature of the invention will be more clearly understood by reference to the following detailed description, the appended claims and the several views illustrated in the accompanying drawings:

IN THE DRAWINGS

Figure 1:
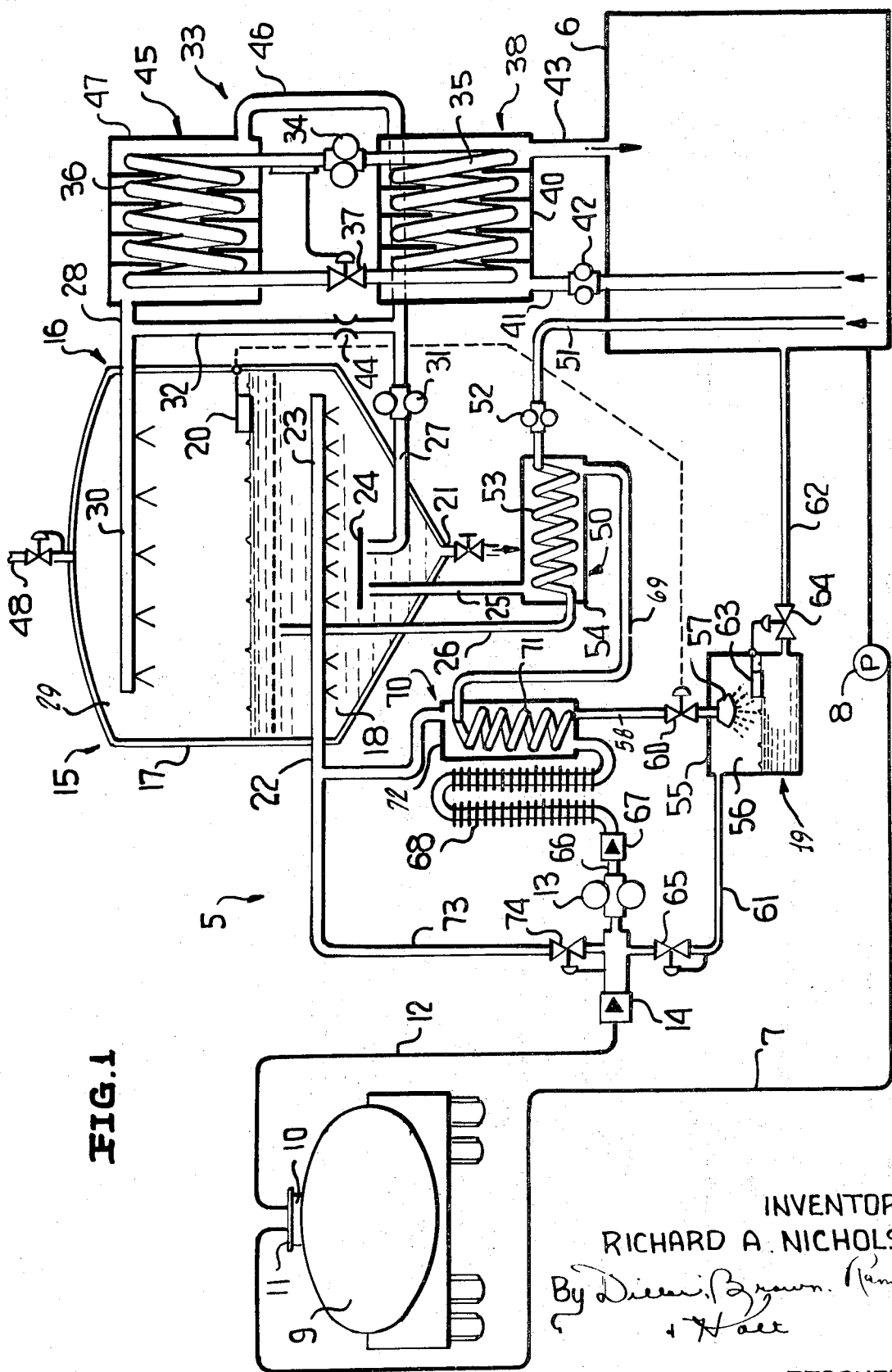
FIG. 1 is a diagrammatic flow diagram of an embodiment of the invention.

Referring now to the drawings in detail, in FIG. 1 there is illustrated a vapor recovery system which is identified by the numeral 5. Since the vapor recovery system 5 finds particular usage in the filling of fuel tanks, particularly tanks of tank trucks, the system will be described as applied thereto although it is to be understood that the invention is not so limited.

Fuel is stored in a fuel storage reservoir 6 and is normally delivered by way of a supply line 7 with the assistance of a pump 8 incorporated therein, to a tank 9 which may be a tank truck. In order that the fuel may be rapidly pumped into the tank 9, the tank is provided with a relatively large vent 10 through which the fuel may be pumped and out through which the vapors may escape. It is the purpose of the vapor recovery system 5 to recover those vapors which normally escape to the atmosphere and are lost from a financial standpoint, as well as polluting the air.

In order that the vapors within the tank 9 may be prevented from escaping, a suitable cover 11 is provided for the vent 10. If desired, the supply line 7 may be directly connected to the cover 11. A vent line 12 extends from the cover 11 and leads to a compressor 13 for compressing the recovered vapors. The vent line 12 has a check valve 14 incorporated therein.

Basically speaking, incoming vapor is pumped by the compressor 13 into an absorber 15 of an absorber system, which is generally identified by the numeral 16. The incoming vapors are absorbed and condensed within the absorber 15 and returned in liquid form through a flash separator 19 to the fuel storage reservoir 6.

ABSORBER SYSTEM

The absorber system 16, of which the absorber 15 is a part, includes a tank 17 in which fuel 18 is maintained at a substantially constant level by means of a float valve 20. The tank 17 is provided with a drain 21. A vapor line 22 delivers vapor from the compressor 13, in a manner to be described hereinafter, into the tank 17 through a distribution manifold 23 which is submerged within the fuel 18. The distribution manifold 23 is downwardly directed so as to prevent fuel from entering distribution manifold 23 and to assure the passage of the vapor through the fuel 18. A baffle 24 is mounted within the fuel 18 beneath the distribution manifold 23. A return line 25 is connected to the lower portion of the tank 17 and has its free end disposed beneath the baffle 24 for receiving the fuel 18.

The absorber system 16 also includes a fuel supply line 26 for delivering fuel into the lower portion of the tank 17 from the fuel storage reservoir 6. The end of the supply line 26 terminates above the distribution manifold 23 and below the level of the fuel 18.

A fuel circulation line 27 is also connected to the lower portion of the tank 17 and has its pick up end disposed beneath the baffle 24. Fuel passing into the fuel circulation line 27 is returned to the upper portion of the absorber 15 through a return line 28 which is connected to a downwardly directed spray head 30 which is mounted in a head space 29 in the tank 17 above the fuel 18. The spray head 30 is downwardly directed for directing sprayed liquid fuel against the upwardly rising vapor and air mixture within the head space 29.

Fuel flowing into the fuel recirculation line 27 is pumped by means of a pump 31 partially through a by-pass line 32 which leads directly to the return line 28, and passed partially through a refrigeration module which is generally identified by the numeral 33. The refrigeration module 33 basically includes a compressor 34, a condenser 35 and an chiller 36. The usual expansion valve 37 is disposed between the condenser and the chiller.

The condenser 35 is part of a liquid heat exchanger unit 38 which utilizes the fuel stored within the fuel storage reservoir 6 as the coolant. The heat exchanger unit 38 includes a jacket 40 surrounding the condenser and fuel is pumped from the fuel storage reservoir 6 into the jacekt around the condenser coil 35 through a supply pipe 41 which is provided with a pump 42. Fuel is returned from the jacekt 40 by means of a return line 43 into the fuel storage reservoir 6.

That portion of the fuel 18 pumped by the pump 31 which does not pass through the by-pass 32, as controlled by an orifice 44 in the by-pass 32, is directed into a heat exchanger 45 of which the chiller 36 is a part, by means of a line 46. The line 46 leads into a jacket 47 of the heat exchanger 45 and fuel is circulated around the chiller coil 36. The fuel 18, which has been cooled through its association with the chiller 36, exits out of the jacket 47 through the return line 28.

The top of the tank 17 is also provided with bleed off line 48 through which air and residual vapor escapes. The end result is that all incoming gas delivered into the absorber 15 through the line 22 either is bled off as air or becomes liquid and is returned to the fuel storage reservoir 6. Of course, it is impossible to completely separate hydrocarbon vapor from the air and a minute portion of the hydrocarbon vapor is bled off with the air through the bleed off line 48.

The lines 25 and 26 are connected to a heat exchanger 50. Fuel from the fuel storage reservoir 6 is pumped through a supply pipe 51 by means of a pump 52 into a coil 53 of the heat exchanger 50 and then into the supply line 26 to the tank 17. On the other hand, chilled fuel exiting from the tank 17 through line 25 passes into a casing 54 of the heat exchanger 50 and circulates about the coil 53, reducing the temperature of the fuel passing from the fuel storage reservoir 6 into the lower portion of the tank 17.

FLASH SEPARATOR

The flash separator 19 basically includes a tank 55 in which fuel 18 is maintained in the lower portion thereof at a constant level. There is head space 56 above the fuel 18 and positioned within the head space 56 is a spray head 57 which is connected to a supply pipe 58 for the flash separator 19. Flow through the supply pipe 58 is controlled by a valve 60 which is controlled by the float 20 so as to maintain the desired fuel level within the tank 17.

A vapor return line 61 is connected to the upper portion of the tank 55 while a fuel return line 62 leading to the fuel storage reservoir 6, is connected to the lower portion of the tank 55. The level of fuel 18 within the tank 55 is maintained by a float 63 controlling the position of a valve 64 incorporated in the return line 62.

Although substantially all of the air within the absorber 15 is vented to the atmosphere through bleed off line 48, the fuel passing out through the return line 25 still contains more absorbed air than desired. When the fuel is sprayed into the flash separator 19, this additional absorbed air is released. This air together with fuel vapor passes through the vapor return line 61 into the vapor line 12 with flow therethrough being controlled by a pressure controlled valve 65. The substantially air free fuel 18 passes into the fuel storage reservoir through the return line 62.

VAPOR FLOW SYSTEM

Incoming vapor discharges from the compressor 13 into a vapor line 66 and passes through a check valve 67 into a finned tube aftercooler 68 which is of the air cooled type and which provides for a material lowering of the temperature of the compressed vapor.

The finned tube aftercooler 68 is connected to a liquid aftercooler 70 which includes a heat exchange coil 71 disposed within a casing 72. Returning fuel passing from the heat exchanger 50 to the flash separator 19 passes through a fuel line 69 into the upper end of the coil 71 and discharges into the return line 58.

The compressed vapor circulates about the coil 71 and is cooled by contact therewith. The cooled vapors pass out of the casing 72 into the vapor line 22 through which it passes into the absorber 15.

It is to be understood that the temperature of the compressed vapor passing from the compressor 13 in many instances will be high enough to vaporize the fuel in the heat exchange coil 71 if the compressed vapors were directly fed to the liquid heat exchanger 70. However, by connecting the heat exchanger 70 in series with the finned tube heat exchanger 68, the compressed vapors are initially sufficiently cooled to prevent vaporization of the fuel passing through the coil 71. In addition to being able to maintain the fuel 18 as a liquid as it passes through the heat exchanger 70, the use of the finned tube aftercooler also makes optimum use of the temperature gradients in the two aftercoolers, thereby providing for greater over-all efficiency.

The vapor recovery system 5 also includes a vapor by-pass line 73 connecting together the vapor lines 12 and 22. The by-pass line 73 is controlled by a pressure control valve 74.

It has been found that the efficiency of the absorber 15 is greatly increased when the fuel is recirculated and discharged within the head space 29 through the spray head 30. By refrigerating the recirculating fuel, the absorber 15 is operated at a lower temperature with the result that it may also operate at a lower pressure with the same efficiency of performance. It has been found that the absorber operation is efficient when the temperature of the fuel 18 within the tank 17 is on the order of 10°F. to −40°F. A typical installation would have the temperature of the fuel 18 at 0°F.

The temperature of the fuel 18 within the absorber tank 17 is 0°F., the refrigerated fuel returning into the upper portion of the tank 17 will have a temperature of −10°F. and the pressure within the tank will be on the order of 50 psig.

Under normal operating conditions, the temperature of fuel in the fuel storage reservoir 6 will be 70°F. and the temperature thereof will be reduced in the heat exchanger 50 to approximately 10°F. On the other hand, the temperature of the fuel 18 flowing through the heat exchanger 50 will be increased to 45°F. After the fuel passes through the aftercooled 70, it will have a temperature of 80°F., at which temperature it will be discharged into the flash separator 19 with the pressure within the flash separator 19 being on the order of 10 psig.

The incoming vapor passing from the compressor 13 into the aftercooler 68 will have a temperature of 320°F. while the compressed vapor passing from the aftercooler 68 into the aftercooler 70 will have a temperature of 170°F. The incoming vapor flowing into the absorber tank 17 will have a temperature of 80°F.

It is to be noted that the pressure within the absorber tank 17 eliminates the need for a pump to pump the returning fuel to the flash separator 19. Also, the pressure within the flash separator provides sufficient push to the liquid to effect the flow thereof to the fuel storage reservoir 6.

Figure 3:
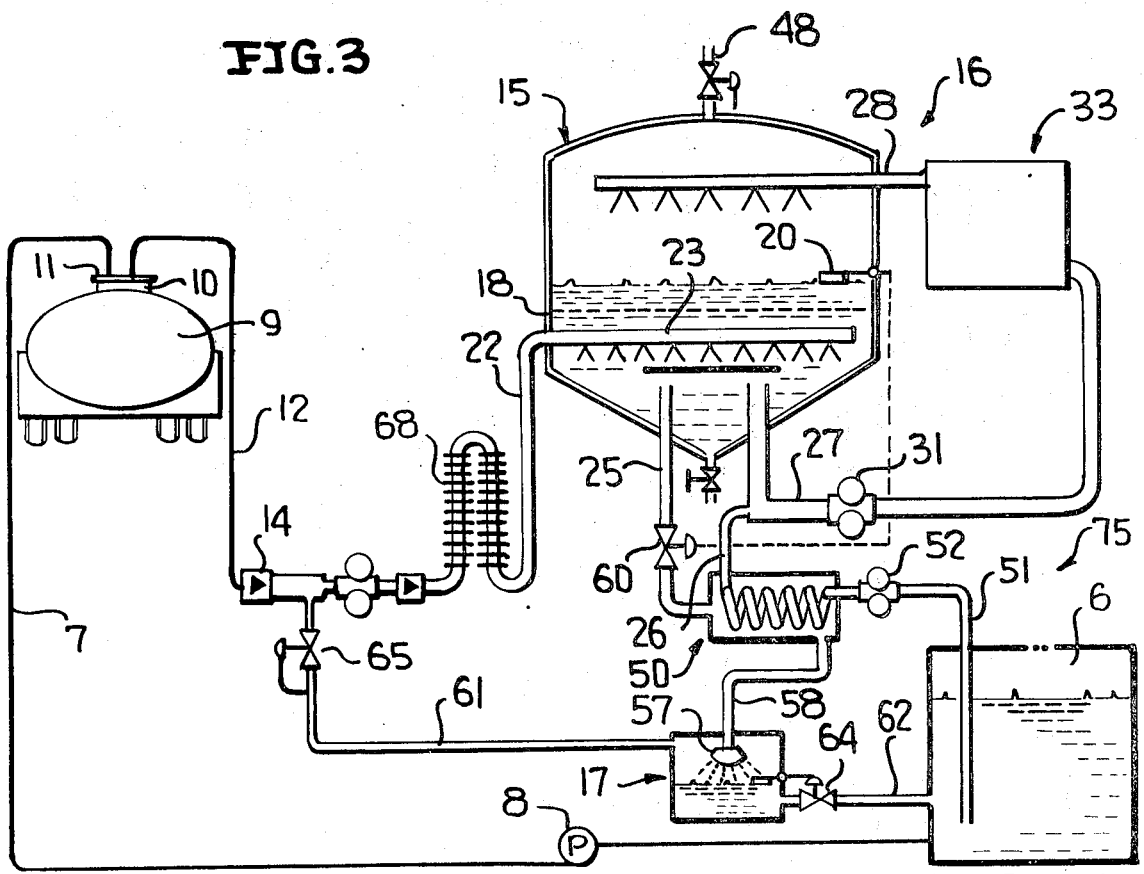
FIG. 3 is a diagrammatic flow diagram of another embodiment of the invention.

Reference is now made to FIG. 3 wherein a slightly modified form of vapor recovery system is illustrated, the modified vapor recovery system being generally identified by the numeral 75. The system 75 differs from the system 5 primarily in that in lieu of the fuel supply line 26 directing fuel from the fuel storage reservoir 6 into the lower portion of the absorber tank 17, the recirculating fuel from the fuel storage reservoir is directed into the fuel circulation line 27 in advance of the pump 31. This permits the fuel being recirculated from the fuel storage reservoir to be refrigerated before it is directed into the absorber 15.

It is also to be noted that the system 75 has certain other omissions as compared with respect to the system 5. While such omissions, and in some instances modifications, are feasible and permissible, it is to be understood that the system 75 may be identical to the system 5 with the exception of the flow from the fuel storage reservoir into the absorber 15.

Figure 2:
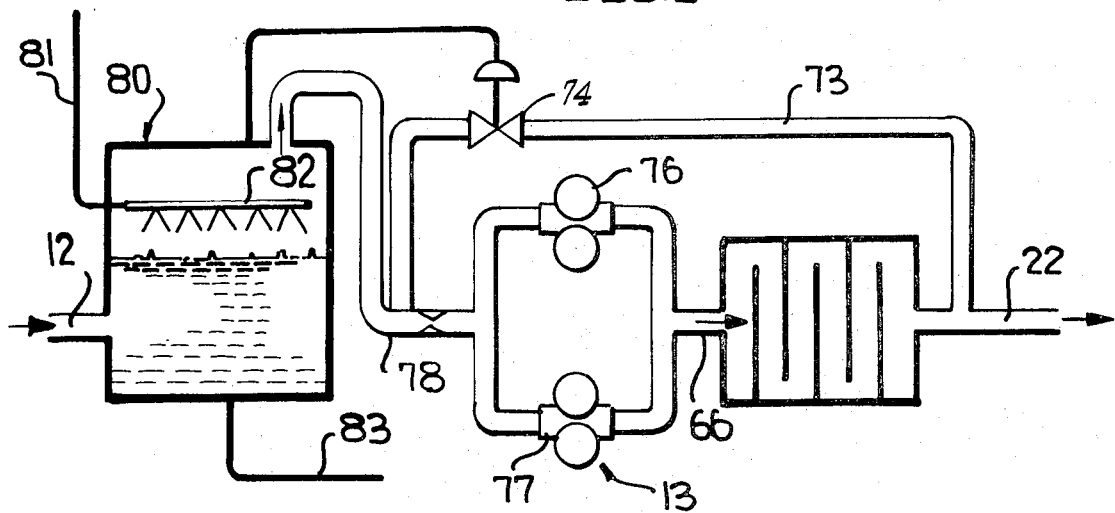
FIG. 2 is a diagrammatic flow diagram of a modified compressor arrangement for handling the recovered vapors.

Reference is now made to the modified compressor arrangement of FIG. 2. While the compressor 13 has only been schematically illustrated, it is to be understood that the compressor may be constructed to have a multiple stage so that it need not run at full capacity at all times. The compressor 13 may be formed as two compressors 76, 77 disposed in parallel and connected to a common vapor supply line 78, which could be the vapor supply line 12.

The compressors 76 and 77 are commonly connected to the vapor line 66 for directing compressed vapor into the aftercooler 68 and also the after cooler 70, when the system is provided with both aftercoolers.

It is to be understood that the compressors 76 and 77 may be run either independently of one another or in unison with one antoher. It is also to be understood that each of the compressors 76,77 may be a multiple speed compressor.

If desired, the vapor supply line may have coupled therein a saturator 80 in advance of the by-pass line 73 and the compressor 13. The saturator may be of any construction, but normally would have directed into the upper portion thereof a fuel supply line 81 for directing fuel from the fuel storage reservoir 6 to a spray head 82 mounted in the upper portion thereof. There would also be connected to the lower portion of the saturator a fuel return line 83 which could deliver the fuel from the saturator either to the absorber 15, the spray head 57 of the flash separator 19 or directed to the fuel storage reservoir 6.

It is to be understood that the proportions of the components shown in the drawings have been exaggerated for clarity purposes and that the vapor receevery systems are relatively compact, and if desired, could be mounted for mobility on a trialer or truck.

Although only three preferred embodiments of the invention have been specifically illustrated and described herein, it is to be understood that minor variations may be made in the vapor recovery systems without departing from the spirit and scope of the invention, as defined by the appended claims.

I claim:

1. A vapor recovery system including means for supplying volatile liquid to a tank, an absorber, means for delivering vapors from the tank to the absorber, a supply of said liquid in the absorber for absorbing said vapors therein, means for withdrawing liquid with absorbed vapors therein from said absorber, refrigeration means for cooling the liquid in said absorber, and means for delivering said supply of said liquid in said absorber from an external source other than said tank.

2. The system of claim 1 wherein said refrigeration means maintains the temperature of said liquid in said absorber between 10°F. and −40°F.

3. The system of claim 1 wherein said refrigeration means maintains the temperature of said liquid in said absorber on the order of 0°F.

4. The system of claim 1 wherein said means connected to said absorber for delivering said supply of liquid to said absorber from an external source is of the type for continuously delivering said supply of liquid.

5. The system of claim 1 wherein said refrigeration means is effective to cool said liquid in said absorber to a temperature below the temperature of liquid in said external source, and heat exchange means for utilizing said withdrawn liquid as a coolant for said supply of liquid being delivered from said external source to said absorber.

6. The system of claim 21 wherein said means for supplying volatile liquid to said tank is connected to said external source for receiving the volatile liquid therefrom separate and apart from the means for delivering liquid to said absorber.

7. The system of claim 1 in which said refrigeration means includes means for cooling at least a portion of said liquid withdrawn from said abosrber and means for returning said cooled liquid to said absorber independently of said external source.

8. The system of claim 7 in which said external source of volatile liquid is a reservoir, said refrigeration means includes a condenser, and means for supplying volatile liquid from said reservoir to said condenser as a coolant from said condensor and returning the same to said reservoir.

9. The system of claim 1 in which said external source of volatile liquid is a reservoir, said refrigeration means includes a condenser, and means for supplying volatile liquid from said reservoir to said condenser as a coolant for said condenser.

10. The system of claim 9 wherein said volatile liquid used as a coolant for said condenser is returned to said reservoir.

11. A vapor recovery system including means for supplying volatile liquid to a tank, an absorber, means for delivering vapors from the tank to the absorber, a supply of said liquid in the absorber for absorbing said vapors therein, means for withdrawing liquid with absorbed vapors therein from said absorber, and means for separating air and vapors carried thereby from said withdrawn liquid.

12. A system according to claim 11 together with heat exchanger means for utilizing said withdrawn liquid as a coolant for vapors prior to being delivered to said absorber.

13. A system according to claim 11 together with means for returning the separated air and vapors carried thereby to said absorber.

14. A system according to claim 13 together with means for deliverying said liquid from which air has been removed to a reservoir.

15. A vapor recovery system including means for supplying volatile liquid to a tank, an absorber, means for delivering vapors from the tank to the absorber, a supply of said liquid in the absorber for absorbing said vapors therein, refrigeration means for cooling the liquid in said absorber, means for withdrawing liquid with absorbed vapors therein from said absorber, means for delivering said supply of liquid to said absorber from an external source other than said tank, and heat exchanger means for utilizing said withdrawn liquid as a coolant for said supply of liqud being delivered from said external source to said absorber.

16. The system of claim 15 wherein said refrigeration means maintains the temperature of said liquid in said absorber between 10°F. and −40°F.

17. The system of claim 15 wherein said refrigeration means maintains the temperature of said liquid in said absorber on the order of 0°F.

18. The system of claim 15 together with means for separating aIr from said withdrawn liquid.

19. A system according to claim 15 together with additional heat exchanger means for also utilizing said withdrawn liquid as a coolant for vapors being delivered to said absorber.

20. A system according to claim 19 wherein said additional heat exchanger means is downstream of said first heat exchanger means in the direction of withdrawn liquid flow from said absorber.

21. A system according to claim 19 wherein there is a third heat exchanger means for receiving vapors and cooling the same in advance of said second heat exchanger means.

22. A vapor recovery system including means for supplying volatile liquid to a tank, an absorber, conduit means for receiving volatile liquid vapor from a tank being supplied with volatile liquid, multi-capacity compressor means connected between said conduit means and said absorber for receiving vapor from said conduit means and delivering vapor to the absorber, said compressor means being of the type wherein a predetermined capacity may be selected in accordance with the requirements of the system, and further conduit means for removing collected vapors from said absorber.

23. A system according to claim 22 wherein there is a pressure controlled by-pass associated with said compressor.

24. A system according to claim 22 wherein said multi-capacity compressor is a multiple speed compressor.

25. A system according to claim 46 wherein said multi-capacity compressor includes two separate selectively operable compressors arranged in parallel.

26. A vapor recovery system including means for supplying volatile liquid to a tank, an absorber, means for delivering vapors from the tank to the absorber, a supply of said liquid in the absorber for absorbing said vapors therein, means for withdrawing liquid with absorbed vapors therein from said absorber, and refrigeration means for cooling the liquid in said absorber, said refrigeration means including means external of said absorber for cooling at least a portion of said liquid withdrawn from said absorber and returning the cooled liquid to said absorber independently of said tank.

27. The system of claim 26 in which there are means for returning another portion of said withdrawn liquid to said absorber independently of said refrigeration means.

28. The system of claim 27 wherein there are means for controlling the volume of said another liquid portion returned to said absorber independent of said refrigeration means.

* * * * *